Patented Feb. 13, 1951

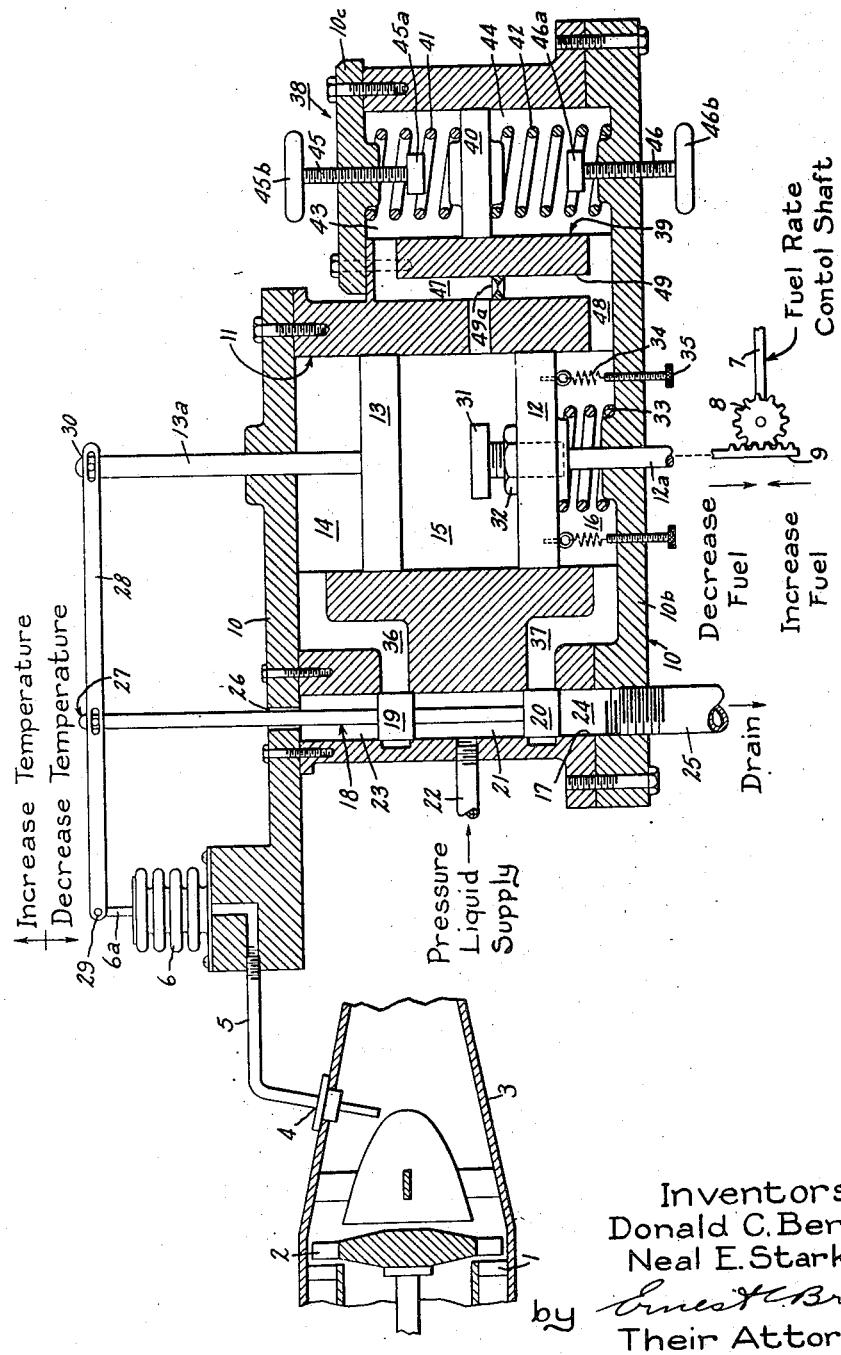

2,541,805

UNITED STATES PATENT OFFICE 2,541,805

RATE OF CHANGE AND MAXIMUM LIMIT DEVICE FOR PRESSURE FLUID SERVOMOTOR REGULATING SYSTEMS

Donald C. Berkey, Scotia, and Neal E. Starkey, Schenectady, N. Y., assignors to General Electric Company, a corporation of New York Application February 9, 1950, Serial No. 143,296

6 Claims. (Cl. 121—41)

This invention relates to a component for use in regulating systems, particularly systems having hydraulic mechanism for moving an output member in accordance with a signal generated by a condition-responsive device.

An object of the invention is to provide a device of the type described capable of limiting the rate of change of the condition being controlled to a predetermined value, regardless of the rate of change of the input signal. Another object is to provide an improved regulating device for limiting the maximum value of the condition to which the device is responsive. A further object is to provide a system which, by suitable design and adjustment, may be arranged to permit a substantially instantaneous change of the input member of a predetermined magnitude, followed by a rate of change at a desired rate, up to a preselected maximum.

While the invention may be applicable generally as a component of many types of regulating systems in which a condition responsive device controls an output member, which in turn regulates the condition to which the device is responsive, it has been conceived particularly for use in connection with hydraulic regulating systems for controlling the fuel supply to a gas turbine powerplant so as to limit the maximum value and rate of change of a temperature condition in the powerplant, specifically the temperature of the exhaust gas from the turbine, and it is that application of the invention which is particularly described herein. The invention obviously may be applied to many other regulating systems where similar problems are encountered.

The present invention is in some respects an improved form of the general type of regulating mechanism disclosed in the copending application of N. E. Starkey, Serial No. 25,504, filed May 6, 1948, now Patent No. 2,528,252, granted October 31, 1950, and assigned to the same assignee as the present application. A specific purpose of the invention is to perform substantially the same functions, as outlined above, with mechanism which is entirely hydraulic, whereas the invention of the above-mentioned copending application incorporated a more complicated mechanical lever arrangement.

Other objects and advantages will be apparent from the following description taken in connection with the accompanying drawing, in which the single figure represents hydraulic regulating mechanism in accordance with the invention adapted to control the fuel supply of a gas turbine powerplant in accordance with changes in the exhaust temperature of the gas leaving the turbine.

Since the details of the gas turbine powerplant are not material to an understanding of the present invention, it is merely indicated diagrammatically in the drawing as having a nozzle ring 1 supplying hot motive fluid to a bucket wheel 2, the exhaust from which flows through a passageway defined by an exhaust conduit 3 containing a suitable temperature responsive device, indicated generally at 4 as being a liquid-filled bulb connected by a conduit 5 with a flexible bellows 6 which will of course expand as the temperature rises and the liquid increases in volume, and contract as temperature decreases. It is to be understood that this temperature responsive means is intended to be diagrammatic only and any suitable servo-motor means might be employed to produce an input signal movement proportional to the temperature to be controlled. It will be apparent therefore that the actuating rod 6a of the temperature responsive bellows is intended to represent any input signal member adapted to produce by any suitable means a displacement proportional to the condition being controlled.

Likewise, the means employed to change the rate of fuel supply to the powerplant is not material to the present invention, therefore this feature is merely represented diagrammatically as being a shaft 7 having a gear 8 engaged by a rack member 9 which is displaced longitudinally by the hydraulic regulator. For purposes of illustration herein, it may be assumed that shaft 7 is the "throttle" which determines the rate of fuel supply to the powerplant.

The hydraulic regulator itself comprises a housing 10 defining three interconnected hydraulic chambers. The first is the main bore 11 in which is slidably disposed an output piston 12 and a follow-up piston 13. The actuating liquid supply chamber defined between the housing and the upper surface of follow-up piston 13 is designated 14 for convenient reference hereafter; the space between pistons 12 and 13 is designated 15; and the space defined between the housing and the lower surface of output piston 12 is designated 16.

The hydraulic pilot means for controlling the flow of actuating liquid to the motor cylinder consists of a bore 17 in which is slidably disposed a pilot valve member 18 having axially spaced disks 19, 20, the space 21 between the disks being a pressure liquid supply chamber filled from a suitable source by way of conduit 22. This source of operating liquid may of course be any suitable type of hydraulic pump (not shown), perhaps driven from the turbine rotor 2. The bore 17 above disk 19 forms a drain chamber 23, and the bore 17 below the disk 20 forms a second drain chamber 24, the latter communicating with a suitable drain conduit 25. Spent liquid entering the upper drain chamber 23 may escape freely through the generous clearance space 26 defined between the housing and the pilot valve stem 18.

The upper end of stem 18 is pivotally connected at 27 to a lever 28 having a left-hand end portion pivoted at 29 to the input member 6a, the other end portion being pivoted at 30 to the rod 13a of the follow-up piston 13.

Threadedly received in the central portion of output piston 12 is an adjustable stop member 31, the distance by which this stop projects from the piston 12 being determined by suitable adjustment of the lock nut 32.

In order to resiliently bias the output piston 12 to a preselected neutral position, a pair of springs are provided at the lower side of the piston. The first of these is a compression spring 33 having a lower end portion engaging the housing and at its upper end surrounding a boss formed on the lower surface of piston 12. Between spring 33 and the circumference of piston 12 there are provided a plurality of tension spring members 34, each connected at one end to the piston and at the other end to an adjustable abutment represented as set screws 35. It will be apparent that the force of the springs 33, 34 are in opposition, and that by suitable adjustment of the thumb screws 35 the tension on the springs 34 may be changed so as to adjust somewhat the neutral position of piston 12. It will be apparent that the output movement of piston 12 is communicated by the piston rod 12a to the rack member 9.

The operation of the mechanism described so far will be readily apparent. Upon an increase in turbine exhaust temperature, the liquid in bellows 6 will expand so that the input signal member 6a rises, whereupon lever 28 pivots clockwise about pivot 30, causing the pilot member 18 to rise and admit pressure liquid from the supply chamber 21 through passage 36 to the pressure chamber 14, causing the follow-up piston 13 to descend. When the pilot member 18 rises, the disk 20 also uncovers the communicating passage 37 so any liquid in the chamber 16 below piston 12 can drain through conduit 25.

It will of course be understood by those familiar with hydraulic servo-mechanism that downward movement of piston 13 brings the pilot disk 19 again into alignment with the entrance to passage 36, so the supply of pressure liquid to chamber 14 is discontinued. Thus there is a definite position of piston 13 for each temperature of the turbine exhaust gas.

It is also to be noted that when pilot member 18 is displaced upwardly so as to supply liquid to chamber 14 and move piston 13 downward in the "increase temperature" direction, the disk 20 simultaneously uncovers passage 37 so that liquid below piston 12, and any passing through the orifice 49a is drained to the passage 24 so that piston 12 is free to move downwardly, and piston 40 is free to seek its "neutral" position, without resistance from any liquid at the lower sides of these pistons.

Movement of piston 13 downwardly would immediately cause piston 12 to likewise move downwardly, if the chamber 15 were filled with liquid, except for the modifying action of the surge chamber arrangement indicated generally at 38. This surge chamber comprises a bore 39 containing a slidable piston 40 which is ordinarily maintained in a neutral equilibrium position by a pair of opposed coil springs 41, 42 disposed in the bore 39 between opposite faces of piston 40 and the respective ends of the bore 39. The chamber above piston 40 is identified as 43, the lower chamber being marked 44.

In order to adjustably limit the movement of piston 40 in either direction, a pair of stops are provided in the form of screw members 45, 46. Screw 45 carries an abutment member 45a adapted to limit the upward movement of piston 40, as adjusted by a hand wheel 45b. Similarly screw 46 carries an abutment 46a for limiting the downward movement of piston 40, adjusted by hand wheel 46b.

It will be apparent from the drawing that chamber 15 communicates with chamber 43 by way of a passage 47, while chamber 16 communicates with chamber 44 by way of passage 48. The two passages 47, 48 are provided with an inter-communicating passage 49 containing a flow restricting device, represented as being a simple sharp-edged type of orifice 49a. While a simple fixed orifice has been shown for purposes of simplicity, it will be obvious to those skilled in the art that any suitable flow restricting means may be employed, such as an adjustable needle valve or a rotary flow restricting "chopper valve" as disclosed in the above-mentioned copending application of N. E. Starkey.

The modifying action of the surge chamber 38, upon the downward movement of piston 13, is as follows.

Assume first that the input member 6a has been stationary for a sufficient length of time that the oil pressure in chambers 15 and 16 has been equalized by flow through the inter-communicating passage 49. Also the piston 40 will assume its neutral position since the pressure in chamber 43 is the same as that in chamber 15, and the pressure in chamber 44 is the same as that in 16. If now the temperature condition increases at such a rate that the piston 13 moves suddenly downward, liquid is displaced from chamber 15 through passage 47 to chamber 43, the flow restriction 40 tending to prevent this liquid from entering passage 48. The centering springs 41, 42 are strong enough to overcome friction and weight of the piston, but are sufficiently light that any appreciable increase in pressure in chamber 43 will immediately cause piston 40 to move swiftly downward to stop 46a. This displacement of piston 40 permits piston 13 to initially move downward without producing any movement of the output piston 12, the centering springs 33, 34 associated with piston 12 being much stiffer than the light springs 41, 42.

Thus the sudden initial downward movement of the surge piston 40 permits the follow-up piston 13 to move downwardly a preselected distance, corresponding to a preselected instantaneous temperature rise, without having any effect on the output piston 12. If the sudden temperature change is greater than this preselected initial increment, pressure built up in chamber 15 by the continued downward movement of piston 13 will cause the output piston 12 to move downwardly against the bias of the compression spring 33, the restricted rate of flow of liquid through the orifice 49a being insufficient to prevent this movement. Thus if the sudden increase in exhaust gas temperature is greater than a preselected permitted amount, the output piston 12 moves downwardly to actuate the throttle shaft 7 in the decrease fuel direction. The decreased fuel supply of course tends to reduce the rate of increase of temperature.

However if the rate of increase of temperature is below a preselected value, the pressure built up in chamber 15 by downward movement of piston 13 may be just sufficient to cause an equalizing flow through the orifice 49a and passage 48 to the underside of piston 12, so there will be no downward movement of the output piston. Thus the size of orifice 49a determines the maximum rate at which the temperature may increase without producing a "decrease fuel" movement of the output piston 12. For this reason it may be advantageous to make the orifice 49a of adjustable size, so the permitted rate of change may be readily altered. To this end any suitable manually adjustable valve or equivalent flow restricting means may be substituted for the simple fixed orifice 49a.

It will of course be understood that during continued increase of temperature at a rate permitted by the restricted flow through orifice 49a, the pressure in chamber 44 will not become completely equalized with that in chamber 43, with the result that the surge piston 40 will remain against stop 46a until piston 13 stops moving and sufficient time has elapsed for fluid in chamber 43 to flow to chamber 44, either due to motion of piston 12 or flow through orifice 49a.

On the other hand, if the temperature decreases suddenly, the pilot member 18 is lowered so as to render liquid above the follow-up piston 13 free to drain through conduit 36 into chamber 23 and out the clearance space 26. Meanwhile pressure liquid is supplied from space 21 through conduit 37 to the lower surface of output piston 12 and also through conduit 48 to the lower surface of surge piston 40. Piston 40 immediately moves upwardly so that liquid displaced above through conduit 47 into chamber 15 will tend to cause the pressure to be equalized on opposite sides of the output piston so that there will be no movement thereof. Also, this supply of liquid to chamber 15 causes the follow-up piston 13 to rise and tends to shut off the supply of liquid through conduit 37. When the surge piston 40 hits stop 45a, pressure is thereafter built up in chamber 16 by the continued supply of liquid through conduit 37. If this rate of supply corresponds to a permissible rate of decrease of temperature, the flow of liquid through orifice 49a will tend to keep the pressure equalized across piston 12 so there will be no movement thereof. This restricted pressure equalizing flow into chamber 15 causes follow-up piston 13 to rise and further decrease the supply of liquid past pilot 18 to chamber 16. When the flow of liquid into chamber 16 corresponds to a rate of decrease of temperature greater than the permissible rate, pressure builds up in chamber 16, and piston 12 rises, causing the rate of fuel supply to increase and thereby check the excessive rate of temperature decrease. This upward movement of piston 12 will cause the follow-up piston 13 to move upwardly and ultimately discontinue the supply of operating liquid to piston 12. Therefore, it will be seen that if the supply of liquid to the bottom surface of piston 12 is at a sufficiently small rate, liquid will be communicated by the restricted orifice 49a to the opposite side of piston 12; and there will be no movement of the output piston unless both the initial increment of change permitted by surge piston 40 is exceeded, and also the rate of change permitted by the orifice 49a is exceeded.

It will be apparent from the above description that the function of the surge chamber 38 with the adjustable stops 45a 46a is to permit a sudden initial increment of change in either direction of the condition being controlled. After such initial change, further change must take place at less than a preselected rate, determined by the size of orifice 49a, or the output member will be caused to move in the appropriate direction to change the fuel supply and bring the temperature and rate of change thereof within the preselected limits.

The maximum temperature which the system will permit is determined by the adjustable stop 31. It will be seen that upon increasing temperature, piston 13 will eventually engage abutment 31, and thereafter piston 12 will be directly forced downward in the decrease fuel direction, thus positively limiting the temperature of the exhaust gases. Suitable adjustment of abutment 31 will determine the maximum temperature which may be permitted.

Thus it will be apparent that, like the regulating mechanism disclosed in the above-mentioned application of N. E. Starkey, this invention provides regulating means which will permit a sudden change in a condition being controlled, followed by a rate of change in the condition at a preselected value, up to a predetermined maximum limiting value.

For convenience in manufacture, the housing 10 may be provided with separately fabricated top and bottom plates 10a, 10b, the surge chamber 38 having a separate top plate 10c. These plates are of course secured to the main body of the housing by suitable threaded fastenings.

Thus the invention provides an "all-hydraulic" regulating component capable of permitting a sudden initial input movement of a preselected magnitude, followed by a rate of change of the input signal in the same direction without response by the output member unless the rate exceeds a preselected value. The magnitude of the "initial jump" may be adjusted by setting the stops 45, 46, and the jump permitted in one direction may obviously be made different from the jump permitted in the other direction. The maximum rate of change of the input signal which may occur without producing an output movement may be changed by substituting an orifice member 49a of an appropriate size. The maximum value of the input signal is attained when piston 13 and stop 31 are in contact, and this limiting condition may be selected by suitable positioning of the adjustable stop 31.

While only one specific modification of the invention has been disclosed completely herein, it will be obvious to those skilled in the art that many changes and substitutions of equivalents may be made. For instance, the fixed orifice 49a may be replaced by a suitable variable flow restriction, as described above. Also the biasing springs disclosed in connection with pistons 12 and 40 may take many other forms. Many other mechanical equivalents for the adjustable abutments 31, 45a, 46a, might be employed. It is desired to cover by the appended claims all such modifications as fall within the true spirit and scope of the invention.

What we claim as new and desire to secure by Letters Patent of the United States is:

1. A hydraulic actuator for a condition responsive system having an input member positioned in accordance with changes in a condition and an output member adapted to control the condition, said actuator comprising walls defining a pilot chamber and a main operating cylinder, a pilot valve member in the pilot chamber connected to be positioned by the input member and adapted to supply operating liquid under pressure to either end of the main cylinder, a follow-up piston slidably disposed in the cylinder and connected to restore the pilot valve member whereby the follow-up piston assumes a preselected position for each corresponding position of the pilot member, and an output piston normally spaced from the follow-up piston and connected to actuate the output member, walls defining a restricted bypass passage for equalizing the pressure differential across the output piston, and resilient means normally maintaining the output piston in an intermediate neutral position, whereby, upon movement of the pilot valve means in either direction, operating liquid is supplied to the respective ends of the main cylinder and the follow-up piston is caused to move, while movement of the output piston is effected only when the rate of supply of actuating liquid exceeds a preselected rate corresponding to the capacity of said restricted bypass passage to equalize the pressures on opposite sides of the output piston.

2. Hydraulic actuating mechanism in accordance with claim 1 and including adjustable stop means interposed between the follow-up and output pistons, whereby upon movement of the follow-up piston towards the output piston said stop means provides an operative engagement between the pistons for positively moving the output piston after a preselected degree of movement of the follow-up piston.

3. Hydraulic actuating mechanism for a condition responsive system having an input member positioned in accordance with changes in a condition and an output member adapted to control the condition, said mechanism comprising walls defining a pilot chamber and a main operating cylinder, a pilot valve member in the pilot chamber connected to be positioned by the input member and adapted to supply operating liquid under pressure to either end of the main cylinder, a follow-up piston and an output piston slidably disposed in said cylinder and normally spaced from each other, means connecting the follow-up piston to the pilot member whereby the piston assumes a preselected position for each corresponding position of the pilot member, means connecting the output piston to the output member, walls defining a bypass passage of restricted cross-section area tending to equalize the pressure differential across the output piston, resilient means normally maintaining the output piston in an intermediate neutral position, a double-acting hydraulic accumulator comprising walls defining a cylinder containing a slidable surge piston and having passages communicating liquid from either side of the surge piston to the corresponding sides of the output piston and other resilient means normally maintaining the surge piston in an intermediate neutral position, whereby, upon movement of the pilot valve means in either direction, operating liquid is supplied to the respective ends of the main cylinder and the follow-up piston is caused to move, while movement of the output piston is effected only after the surge piston has moved against its biasing means to one end of its range of movement and the rate of supply of actuating liquid continues and exceeds a preselected rate corresponding to the capacity of said restricted bypass passage to equalize the pressure differential across the output piston.

4. Hydraulic actuating mechanism in accordance with claim 3 and including adjustable stop means for limiting the movement of the surge piston in at least one direction for determining the degree to which the follow-up piston may initially move without effect on the output piston.

5. A hydraulic actuator for a condition-responsive system having an input member positioned in accordance with changes in a condition and an output member adapted to control the condition, said actuator comprising walls defining three chambers, the first being a pilot chamber containing a pilot valve member connected to be positioned by the input member and adapted to supply operating liquid under pressure to opposite ends of the second chamber, said second chamber containing a follow-up piston connected to restore the pilot valve member to discontinue the supply of liquid whereby said piston assumes a definite position for each position of the input member, said second chamber also containing an output piston spaced from the follow-up piston and connected to actuate the output member, the third chamber containing a surge piston with resilient means for maintaining it in an intermediate neutral position when the pressures on opposite sides thereof are equal, other resilient means normally maintaining the output piston in an intermediate neutral position when the pressures on opposite sides thereof are equalized, said housing also defining a first conduit for supplying operating liquid under pressure from the pilot means to the side of the follow-up piston remote from the output piston, second conduit means for supplying operating liquid to the surface of the output piston remote from the follow-up piston, third conduit means for supplying liquid freely from the chamber defined between follow-up and output pistons to one side of the surge piston, a fourth conduit for supplying liquid from said second conduit freely to the other side of the surge piston, a fifth conduit connecting said third and fourth conduits, and flow restricting means in said fifth conduit, whereby, upon movement of the pilot valve means in one direction, operating liquid is supplied to the follow-up piston causing it to move towards the output piston and liquid to be displaced through the third conduit to cause the surge piston to move to one extreme of its range of movement, with the result that the output piston is caused to move against the bias of its resilient centering members only when the movement of the follow-up piston is in excess of the initial change corresponding to said movement of the surge piston and then continues at a preselected rate determined by the capacity of the orifice in the fifth conduit to equalize the pressures across the output piston, whereas movement of the pilot valve means in the opposite direction effects the supply of pressure liquid to the side of the output piston remote from the follow-up piston and to the other side of the surge piston, so that the surge piston moves to the other extreme of its range of movement tending to restore the follow-up piston and equalize the pressures on opposite sides of the output piston, whereby the output piston is caused to move in the opposite direction only when the supply of pressure liquid thereto is sufficient to move the surge piston to the other extreme of its range of movement and then continues at a rate in excess of the capacity of said orifice to equalize the pressures on opposite sides of the output piston.

6. Hydraulic actuating mechanism for a condition responsive system having an input member positioned in accordance with changes in a condition and an output member adapted to control the condition, said actuating mechanism comprising walls defining three cylindrical bores, the first being a pilot chamber containing a pilot valve member connected to be positioned by the input member and adapted to supply operating liquid under pressure to the second bore, a follow-up piston slidably disposed in the second bore and connected to restore the pilot valve member to discontinue the supply of liquid, an output piston also disposed in the second bore in spaced relation with the follow-up piston and connected to position the output member, the third bore containing a surge piston with resilient means normally maintaining the output piston in an intermediate neutral position, said housing also defining a first conduit for supplying operating liquid under pressure from the pilot chamber to the side of the follow-up piston remote from the output piston, second conduit means for supplying operating liquid to the side of the output piston remote from the follow-up piston, third conduit means for supplying liquid freely from the chamber defined between follow-up and output pistons to one side of the surge piston, a fourth conduit for supplying liquid from the pilot chamber freely to the other side of the surge piston, a fifth passage connecting said third and fourth conduits and being of restricted effective area whereby, upon movement of the pilot valve means in one direction, operating liquid is supplied to the follow-up piston causing it to move towards the output piston to displace liquid through the third conduit and cause the surge piston to move to one extreme of its range of movement with the result that the output piston remains stationary throughout an initial preselected movement of the follow-up piston, whereas movement of the pilot valve means in the opposite direction effects the supply of pressure liquid to the side of the output piston remote from the follow-up piston and to the other side of the surge piston whereby the surge piston moves to the other extreme of its range of movement displacing liquid through the third conduit and tending to restore the follow-up piston so the output piston again remains stationary during a preselected degree of movement of the input member, after which the output member moves only if the rate of supply of liquid exceeds the capacity of said fifth restricted passage to equalize the pressure differential across the output piston.

DONALD C. BERKEY.
NEAL E. STARKEY.

No references cited.